(12) United States Patent
Nishiyama

(10) Patent No.: US 11,079,696 B2
(45) Date of Patent: Aug. 3, 2021

(54) PROCESSING DEVICE AND IMAGE FORMING APPARATUS

(71) Applicant: SHARP KABUSHIKI KAISHA, Sakai (JP)

(72) Inventor: Takeshi Nishiyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/700,461

(22) Filed: Dec. 2, 2019

(65) Prior Publication Data

US 2020/0174393 A1 Jun. 4, 2020

(30) Foreign Application Priority Data

Dec. 3, 2018 (JP) .............................. JP2018-226480

(51) Int. Cl.
*G03G 15/02* (2006.01)
*G06F 3/12* (2006.01)

(52) U.S. Cl.
CPC ....... *G03G 15/0216* (2013.01); *G06F 3/1274* (2013.01); *G03G 2215/025* (2013.01)

(58) Field of Classification Search
CPC .......... G03G 15/0216; G03G 2215/025; G06F 3/1274
See application file for complete search history.

(56) References Cited

U.S. PATENT DOCUMENTS

| 5,095,335 A * | 3/1992 | Watanabe ......... G03G 15/0216 399/111 |
| 5,465,136 A * | 11/1995 | Watanabe ......... G03G 15/0216 399/111 |
| 5,596,395 A * | 1/1997 | Sawamura ........ G03G 15/0216 361/221 |
| 5,638,158 A * | 6/1997 | Sanpe ............... G03G 15/0216 361/214 |
| 6,385,420 B1 * | 5/2002 | Morioka ........... G03G 15/0216 399/115 |
| 2007/0253726 A1 * | 11/2007 | Kagawa ............ G03G 21/0011 399/100 |
| 2009/0297212 A1 * | 12/2009 | Anan ................ G03G 15/0233 399/111 |

(Continued)

FOREIGN PATENT DOCUMENTS

JP 2013-020274 A 1/2013

*Primary Examiner* — Francis C Gray
(74) *Attorney, Agent, or Firm* — ScienBiziP, P.C.

(57) ABSTRACT

A processing device includes: a frame that supports a photosensitive drum; a bearing member that biases a charge roller in the direction to be in contact with the photosensitive drum; and a holder that is switchable between a holding state where the charge roller is separated from the photosensitive drum and a canceled state where the holding state is canceled so that the roller is brought into contact with the photosensitive drum; wherein a canceling member is provided in at least one of inside the processing-device attachment and an attachment body attached to an image forming apparatus main body at a front side to cause the holder to shift from the holding state to the canceled state. The canceling member causes the holder to shift from the holding state to the canceled state when the attachment body is attached to the image forming apparatus main body at the front side.

4 Claims, 13 Drawing Sheets

(56) References Cited

U.S. PATENT DOCUMENTS

| | | | |
|---|---|---|---|
| 2012/0177407 A1* | 7/2012 | Lee | G03G 21/1814 399/168 |
| 2013/0129381 A1* | 5/2013 | Jang | G03G 21/1695 399/110 |
| 2017/0139340 A1* | 5/2017 | Morishita | G03G 15/0216 |
| 2020/0096891 A1* | 3/2020 | Yamamoto | G03G 15/0216 |

\* cited by examiner

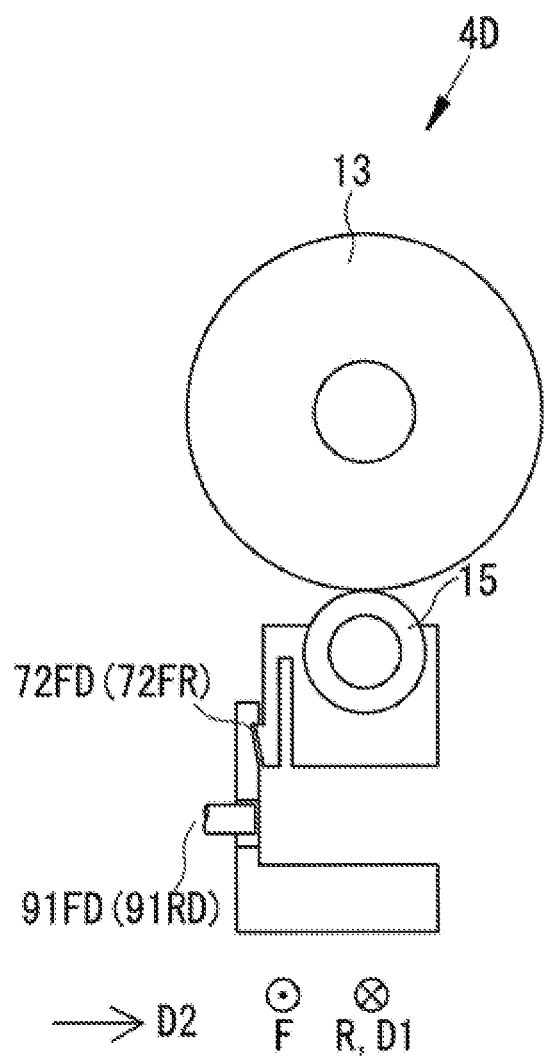

PROCESSING DEVICE AND IMAGE FORMING APPARATUS

BACKGROUND OF THE INVENTION

Field of the Invention

The present invention relates to an electrophotographic image forming apparatus and a processing device included in the image forming apparatus.

Description of the Background Art

An electrophotographic image forming apparatus uses a processing device including a photosensitive drum and various functional devices as a device in consideration of the easiness of maintenance, etc. The processing device is configured to be easily attached to or detached from an image forming apparatus main body.

In a case where the processing device includes a charge roller that charges the photosensitive drum, the charge roller is biased toward and is brought into contact with the photosensitive drum with a predetermined pressure so that the charge roller is uniformly in contact with the surface of the photosensitive drum.

Because of the contact between the charge roller and the photosensitive drum with a predetermined pressure, the charge roller may be deformed, or the like, if the processing device is stored without being used for a long period of time. Therefore, there is a disclosed image forming apparatus in which the photosensitive drum and the charge roller are separated from each other and, when the processing device is attached to the image forming apparatus and the drive load of the image forming apparatus exceeds a predetermined load, the charge roller shifts from the separated state to the contact state (see, for example, Japanese Unexamined Patent Application Publication No. 2013-020274).

The technology disclosed in Japanese Unexamined Patent Application Publication No. 2013-020274, however, has a problem in that the need for a separate mechanism that shifts the charge roller from the separated state to the contact state causes the complicated structures of the image forming apparatus and the processing device.

The present invention has an object to provide a processing device and an image forming apparatus with which it is possible to shift a photosensitive drum and a charge roller from a non-contact state to a contact state without a complicated structure so as to prevent the deformation, or the like, of the charge roller.

SUMMARY OF THE INVENTION

A processing device according to the present invention is a processing device inserted into a processing-device attachment provided in an image forming apparatus main body from a front side to a rear side of the image forming apparatus main body, the processing device includes: a photosensitive drum; a charge roller; a frame that supports the photosensitive drum; a bearing member that supports the charge roller and biases the charge roller in a direction to be in contact with the photosensitive drum; and a holder that is switchable between a holding state in which the charge roller is held at a state of being separated from the photosensitive drum and a canceled state in which the holding state is canceled so that the charge roller shifts to a state of being in contact with the photosensitive drum; wherein a canceling member is provided in at least one of inside the processing-device attachment and an attachment body attached to the front side of the image forming apparatus main body in a state where the processing device is attached to the processing-device attachment so as to cause the holder to shift from the holding state to the canceled state, and wherein the canceling member causes the holder to shift from the holding state to the canceled state when the attachment body is attached to the front side of the image forming apparatus main body in a state where the processing device is attached to the processing-device attachment (a first configuration).

With the above-described configuration, the canceling member causes the holder to shift from the holding state to the canceled state when the attachment body is attached to the front side of the image forming apparatus main body in a state where the processing device is attached to the processing-device attachment. The operation of attaching the attachment body to the image forming apparatus main body causes the processing device to shift from the holding state to the canceled state, whereby it is possible to shift the photosensitive drum and the charge roller from a non-contact state to a contact state without a complicated structure of the processing device so as to prevent the deformation, or the like, of the charge roller.

According to the above-described first configuration, the holder may include: an engaging section provided in any one of the frame and the bearing member; and an engaged section provided in another one of the frame and the bearing member, wherein the engaging section is engaged with the engaged section in the holding state, and the engaging section is disengaged from the engaged section in the canceled state (a second configuration).

With the above-described configuration, the engaging section is engaged with the engaged section in the holding state, and the engaging section is disengaged from the engaged section in the canceled state. Thus, with a simple configuration, the photosensitive drum and the charge roller may shift from a non-contact state to a contact state.

According to the above-described second configuration, the engaging section may be moved in a direction parallel to a direction from the front side to the rear side of the image forming apparatus main body in a state where the processing device is attached to the processing-device attachment so as to shift from a state of engagement with the engaged section to a state of disengagement (a third configuration).

With the above-described configuration, the engaging section is moved in a direction parallel to a direction from the front side to the rear side of the image forming apparatus main body so as to shift from the state of engagement with the engaged section to the state of disengagement. Thus, with the use of the operation of attaching the attachment body to the image forming apparatus main body, it is possible to shift the engaging section to the state of disengagement from the engaged section with a simple configuration.

According to the above-described second configuration, the engaging section may be moved in a direction perpendicular to a direction from the front side to the rear side of the image forming apparatus main body in a state where the processing device is attached to the processing-device attachment so as to shift from a state of engagement with the engaged section to a state of disengagement (a fourth configuration).

With the above-described configuration, the engaging section is moved in a direction perpendicular to a direction from the front side to the rear side of the image forming apparatus main body so as to shift from a state of engagement with the engaged section to a state of disengagement.

Thus, the positions of the engaging section and the engaged section may be set at various positions, and with the use of the operation of attaching the attachment body to the image forming apparatus main body, the engaging section may shift to the state of disengagement from the engaged section.

According to any one of the above-described second to fourth configurations, the holder may further include an insertion section through which the canceling member is inserted and shift from the holding state to the canceled state when the canceling member is brought into contact with the engaging section through the insertion section (a fifth configuration).

With the above-described configuration, the holder shifts from the holding state to the canceled state when the canceling member is brought into contact with the engaging section through the insertion section. Thus, a part protruding from the processing device may be reduced, and an increase in the size of the processing device and the processing-device attachment of the image forming apparatus main body may be prevented.

According to any one of the above-described first to fifth configurations, the attachment body may be any one of a development device, a positioning device, a waste toner box, and a front cover (a sixth configuration).

With the above-described configuration, any one of a development device, a positioning device, a waste toner box, and a front cover may be used as the attachment body, and the operation of attaching the attachment body to the image forming apparatus main body may cause the processing device to shift from the holding state to the canceled state.

The image forming apparatus according to the present invention includes the processing device having any one of the above-described first to sixth configurations (a seventh configuration).

With the above-described configuration, the operation of attaching the attachment body to the image forming apparatus main body causes the processing device to shift from the holding state to the canceled state, whereby it is possible to shift the photosensitive drum and the charge roller from a non-contact state to a contact state without a complicated structure of the processing device so as to prevent the deformation, or the like, of the charge roller and facilitate the maintenance.

With the processing device and the image forming apparatus according to one aspect of the present invention, the operation of attaching the attachment body to the image forming apparatus main body causes the processing device to shift from the holding state to the canceled state, whereby it is possible to shift the photosensitive drum and the charge roller from a non-contact state to a contact state without a complicated structure of the processing device so as to prevent the deformation, or the like, of the charge roller.

BRIEF DESCRIPTION OF THE DRAWINGS

FIGS. 12A and 12B are cross-sectional views schematically illustrating part of a processing device according to a fifth embodiment of the present invention.

DESCRIPTION OF THE PREFERRED EMBODIMENTS

First Embodiment

Figure 1:
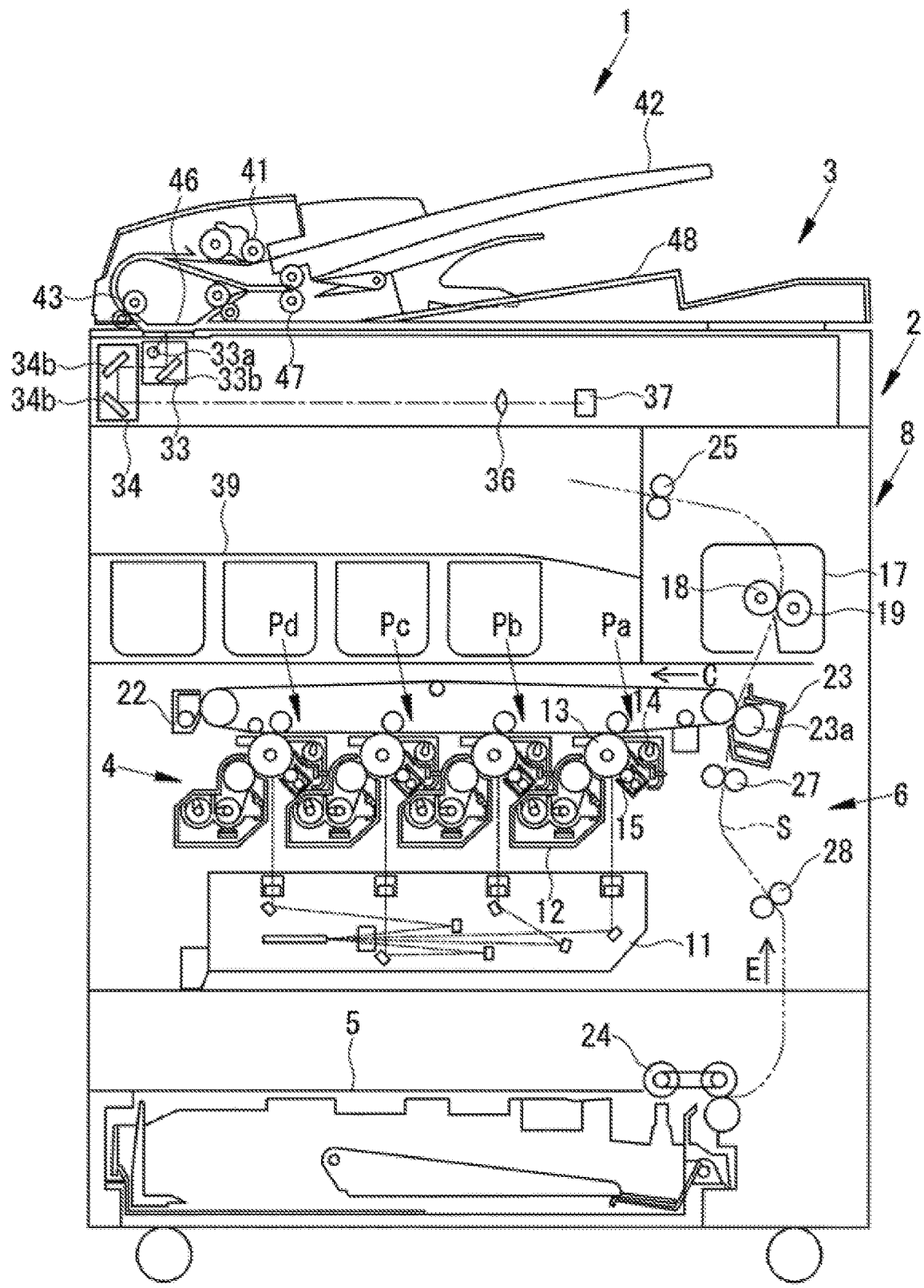
FIG. 1 is a cross-sectional view illustrating an image forming apparatus to which a processing device according to a first embodiment of the present invention is applied.

An embodiment of the present invention is described below with reference to the drawings. FIG. 1 is a cross-sectional view illustrating an image forming apparatus to which a processing device according to a first embodiment of the present invention is applied. An image forming apparatus 1 reads and prints color images and monochrome images. The image forming apparatus 1 includes, for example, a print function to print an image of a recording sheet, a scan function to read an image of a document, and a copy function to read an image of a document and print the image of the document on a recording sheet.

The image forming apparatus 1 includes a document read device 2, a document feed device 3, a processing device 4, a sheet feed cassette 5, and a sheet feed device 6. The processing device 4, the sheet feed cassette 5, and the sheet feed device 6 are built in an image forming apparatus main body 8. The document read device 2 and the document feed device 3 are installed in the upper side of the image forming apparatus main body 8. An operation panel (not illustrated) is provided on the end of the front side (the user's standing position side) of the document read device 2. The operation panel is operated by a user to selectively activate the print function, the scan function, the copy function, etc. of the image forming apparatus 1 or to select any one of a color image and a monochrome image.

To print a color image by using colors, i.e., black (K), cyan (C), magenta (M), and yellow (Y), or print a monochrome image by using a single color (e.g., black) on a recording sheet, the processing device 4 includes four development devices 12, four photosensitive drums 13, four drum cleaning devices 14, and four charge rollers 15 that correspond to black, cyan, magenta, and yellow, respectively, to form four image forming stations Pa, Pb, Pc, and Pd. An optical scanning device 11 is provided below the image forming stations Pa, Pb, Pc, and Pd.

In each of the image forming stations Pa, Pb, Pc, and Pd, the drum cleaning device 14 removes and collects the residual toner from the surface of the photosensitive drum 13, and then the charge roller 15 uniformly charges the surface of the photosensitive drum 13 so as to have a predetermined potential. Then, after an electrostatic latent image is formed on the surface of the photosensitive drum 13 due to the exposure to the surface of the photosensitive drum 13 from the optical scanning device 11, the development device 12 develops the electrostatic latent image on the surface of the photosensitive drum 13 to form a toner image on the surface of the photosensitive drum 13. As a result, the toner image of each color is formed on the surface of each of the photosensitive drums 13.

Subsequently, while an intermediate transfer belt 21 is rotationally moved in the direction of an arrow C, the residual toner on the intermediate transfer belt 21 is removed and collected by the belt cleaning device 22. Then, the toner image of each color on the surface of each of the photosensitive drums 13 is sequentially transferred and superimposed onto the intermediate transfer belt 21 to form a color toner image on the intermediate transfer belt 21.

A nip area is formed between the intermediate transfer belt 21 and a transfer roller 23a of a secondary transfer device 23. The recording sheet conveyed through a sheet conveyance path S is sandwiched into the nip area and conveyed, while the color toner image on the surface of the intermediate transfer belt 21 is transferred onto the recording sheet. Then, the recording sheet is sandwiched between a heating roller 18 and a fixing roller 19 in a fixing device 17 so as to be heated and pressed so that the color toner image on the recording sheet is fixed.

In the sheet feed device 6, a recording sheet is pulled out of the sheet feed cassette 5 by a pick-up roller 24, conveyed through the sheet conveyance path S, passed through the secondary transfer device 23 and the fixing device 17, and discharged onto a sheet discharge tray 39 through a pair of sheet discharge rollers 25. The sheet conveyance path S is provided with a pair of registration rollers 27, a pair of feed rollers 28, the sheet discharge rollers 25, etc. The registration rollers 27 temporarily stop the recording sheet, align the leading edge of the recording sheet, and then start to convey the recording sheet in synchronization with the transfer timing of the color toner image in the nip area between the intermediate transfer belt 21 and the transfer roller 23a. The feed rollers 28 facilitate the feeding of the recording sheet.

Next, the schematic configurations of the document read device 2 and the document feed device 3 installed in the upper part of the image forming apparatus main body 8 are described. One side of the document feed device 3 at the rear side is pivotally supported by the document read device 2, and the front side of the document feed device 3 is opened and closed such that the front side thereof is lifted and lowered. When the document feed device 3 is opened, a document read glass 31 and a document placement glass 32 of the document read device 2 are exposed so that a document may be placed on the document placement glass 32.

In the document read device 2, a first scanner 33 and a second scanner 34 are moved while a predetermined speed relationship between each other is maintained, and a light source 33a of the first scanner 33 emits light to the document on the document placement glass 32. Mirrors 33b and 34b of the first scanner 33 and the second scanner 34 guide the light reflected from the document to an imaging lens 36, and the imaging lens 36 forms the image of the document on a charge-coupled device (CCD) 37. The CCD 37 repeatedly reads the image of the document in the main scanning direction and outputs the image data representing the image of the document.

The document read device 2 may read an image of a document conveyed by the document feed device 3 as well as a stationary document. In this case, the first scanner 33 is moved to a read position below the document read glass 31, the second scanner 34 is positioned in accordance with the position of the first scanner 33, and, in this state, the feeding of the document is started by the document feed device 3.

In the document feed device 3, the document on a document tray 42 is pulled by a pick-up roller 41, the document is conveyed through a document conveyance path 43, and the document is passed between the document read glass 31 and an opposing guide plate 46 and discharged through a pair of sheet discharge rollers 47 to a sheet discharge tray 48.

When the document is conveyed, the light source 33a of the first scanner 33 emits light to the document through the document read glass 31, and the mirrors 33b and 34b of the first scanner 33 and the second scanner 34 reflect the light reflected from the document and guides it to the imaging lens 36. The imaging lens 36 forms the image of the document on the CCD 37, and the CCD 37 reads the image of the document.

The image of the document read by the CCD 37 is output as an analog signal from the CCD 37, and the analog signal is converted into a digital signal. The digital signal (image data) is subjected to various types of image processing and is then input to the optical scanning device 11 of the processing device 4. The image represented by the image data is formed on the recording sheet by the processing device 4.

Figure 2:
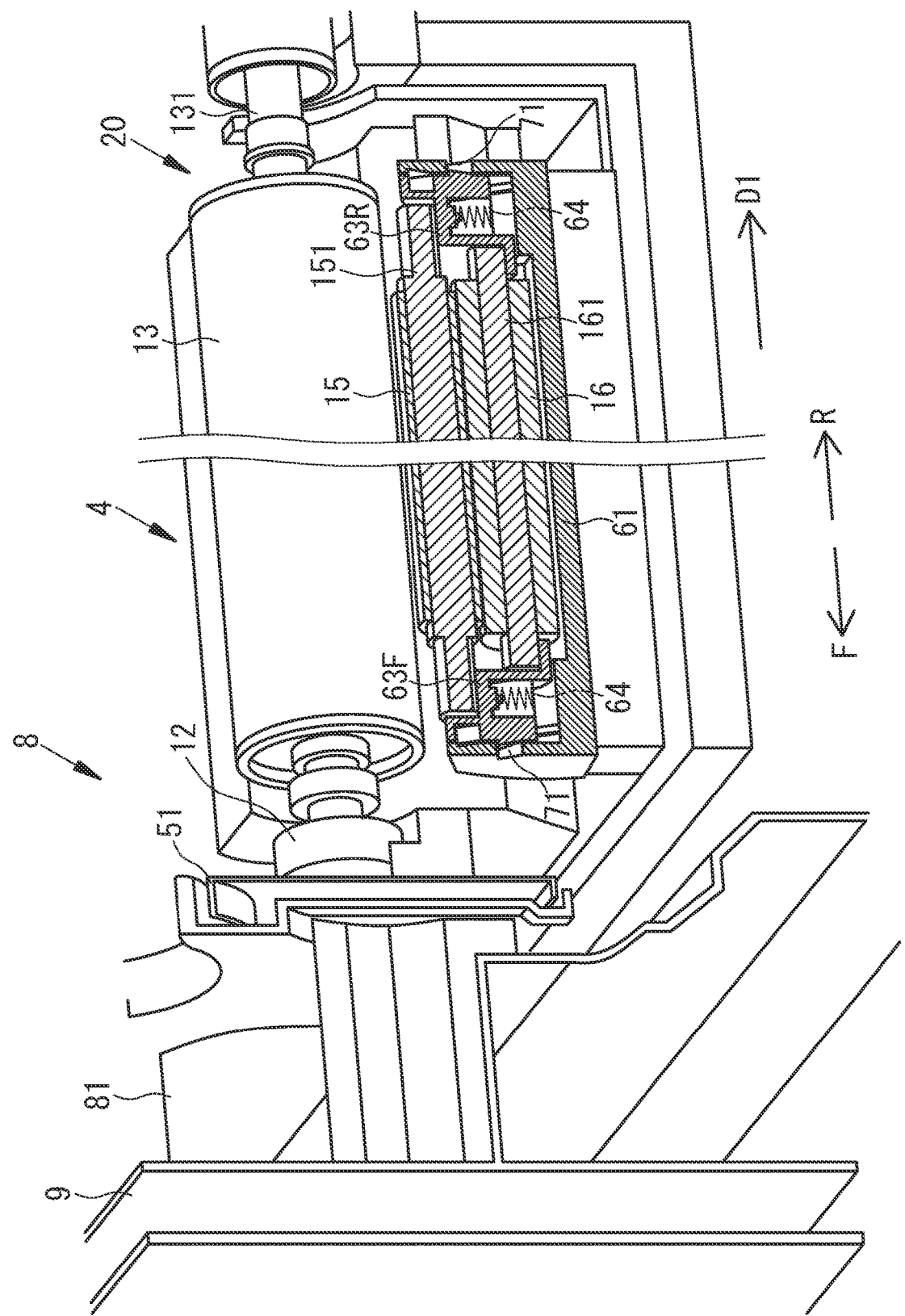
FIG. 2 is a perspective view illustrating a state in which the processing device is attached to an image forming apparatus main body.

FIG. 2 is a perspective view illustrating the state in which the processing device 4 is attached to the image forming apparatus main body 8. FIG. 2 illustrates the partially cut-out processing device 4. As illustrated in FIG. 2, the image forming apparatus main body 8 includes a processing-device attachment 20 to which the processing device 4 is attached. The processing device 4 is attached to the processing-device attachment 20 such that the processing device is inserted from the front side to the rear side of the image forming apparatus main body 8. An arrow F indicates the front side of the image forming apparatus main body 8, and an arrow R indicates the rear side of the image forming apparatus main body 8. An arrow D1 indicates the insertion direction of the processing device 4 in a case where the processing device 4 is attached to the processing-device attachment 20.

The development device 12, a positioning device 51, a waste toner box 81, and a front cover 9 are provided around the processing device 4 attached to the processing-device attachment 20.

The development device 12 is a device that develops an electrostatic latent image on the surface of the photosensitive drum 13 to form a toner image on the surface of the photosensitive drum 13. The development device 12 is attachable to and detachable from the image forming apparatus main body 8. The development device 12 is attached to the image forming apparatus main body 8 in a state where the processing device 4 is attached to the image forming apparatus main body 8. In a state where the development device 12 is attached to the image forming apparatus main body 8, part of the development device 12 is placed on the front side F of the processing device 4.

The positioning device 51 is a device that sets the position of the processing device 4 with respect to the image forming apparatus main body 8. The positioning device 51 is attachable to and detachable from the image forming apparatus main body 8. The positioning device 51 is attached to the processing device 4 at the front side F in a state where the processing device 4 is attached to the image forming apparatus main body 8. According to the embodiment, the positioning device 51 corresponds to an attachment body of the present invention.

The waste toner box 81 accommodates the residual toner removed from the surface of the photosensitive drum 13 by the drum cleaning device 14. The waste toner box 81 is attachable to and detachable from the image forming apparatus main body 8. The waste toner box 81 is located on the front side F of the image forming stations Pa, Pb, Pc, and Pd (see FIG. 1) in a state where the processing device 4 is attached to the image forming apparatus main body 8.

The front cover 9 is a cover that opens and closes the front surface of the image forming apparatus main body 8. The front cover 9 is opened and closed during, for example, the maintenance of the image forming apparatus main body 8. The front cover 9 is closed after the processing device 4 is replaced, or the like, and the processing device 4 is attached so that the front cover is located on the front side F of the processing device 4.

The processing device 4 includes the photosensitive drum 13, the charge roller 15, a cleaning roller 16, a frame 61, a bearing member 63, and a holder 71.

The cleaning roller 16 is in contact with the charge roller 15 and is rotated in accordance with the rotation of the charge roller 15 to clean the surface of the charge roller 15.

The frame 61 is a member that supports the photosensitive drum 13 and the bearing member 63 (a front bearing member 63F and a rear bearing member 63R). Specifically, the frame 61 rotatably supports the ends of a shaft 131 of the photosensitive drum 13 on the front side F and the rear side R and supports the bearing member 63 (the front bearing member 63F and the rear bearing member 63R) so as to move in a direction close to and away from the photosensitive drum 13.

The bearing member 63 is a member that includes the front bearing member 63F and the rear bearing member 63R and that supports the charge roller 15 and the cleaning roller 16. The front bearing member 63F and the rear bearing member 63R are biased by a biasing member 64 in a direction to be in contact with the charge roller 15 and the photosensitive drum 13.

Figure 3:
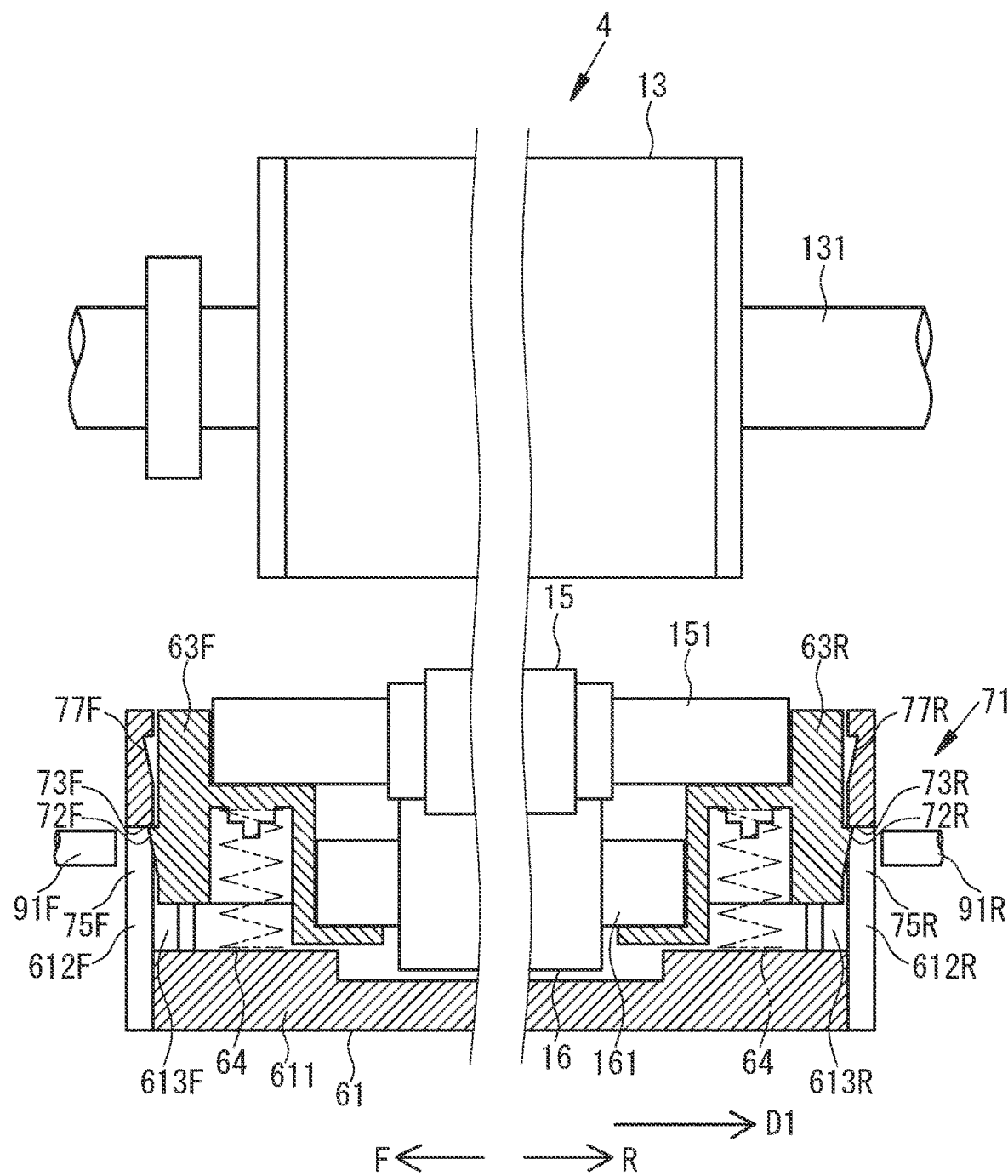
FIG. 3 is a cross-sectional view schematically illustrating part of the processing device.
Figure 4:
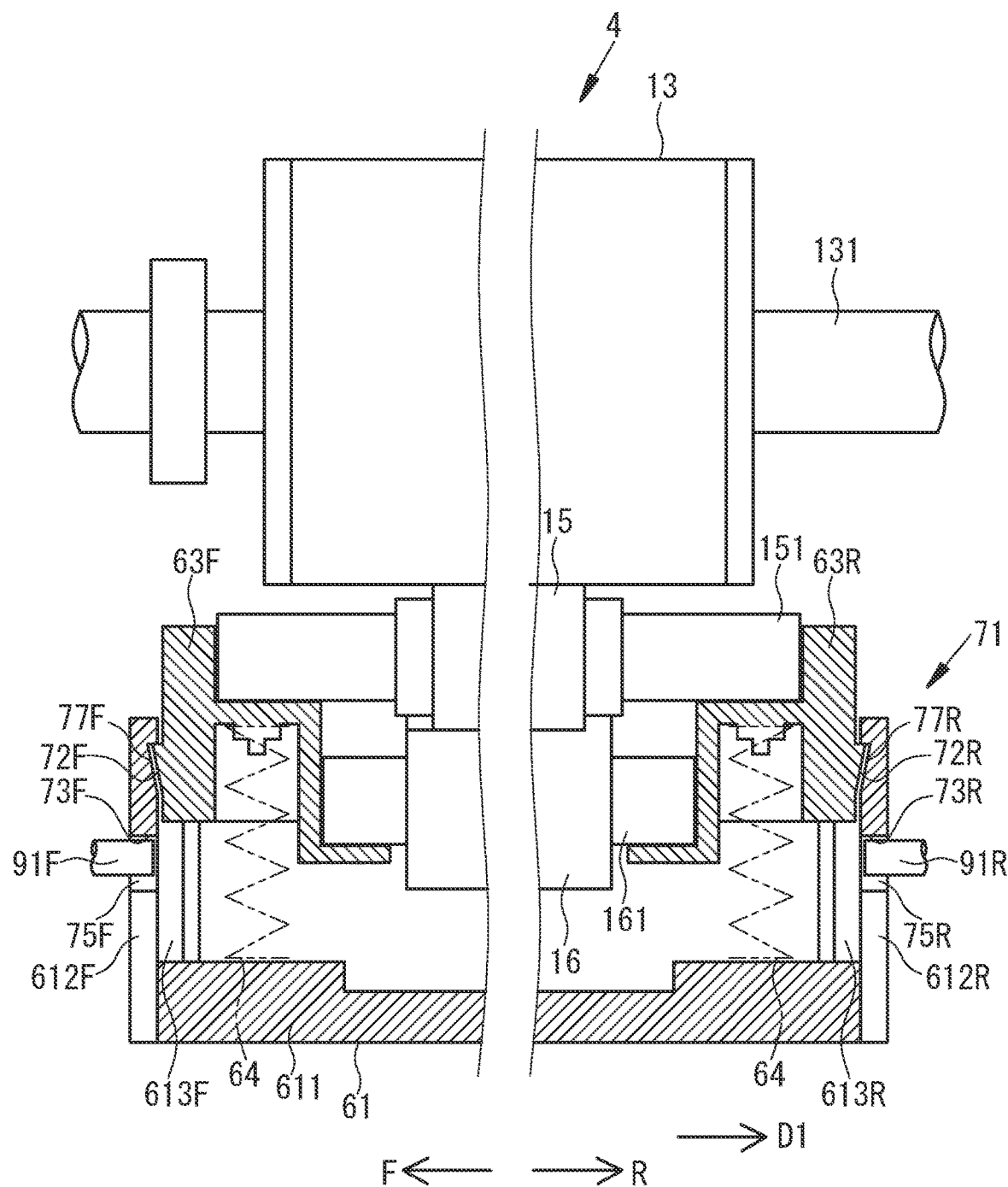
FIG. 4 is a cross-sectional view schematically illustrating part of the processing device.

The holder 71 may be switched between a holding state PA1 (see FIG. 3) and a canceled state PA2 (see FIG. 4). Specifically, the holder 71 switches the position of the bearing member 63 (the front bearing member 63F and the rear bearing member 63R) relative to the frame 61. When the holder 71 is in the holding state PA1 (see FIG. 3), the holder 71 holds the charge roller 15 away from the photosensitive drum 13. When the holder 71 is in the canceled state PA2 (see FIG. 4), the holder 71 shifts the charge roller 15 so as to be in contact with the photosensitive drum 13. The structures of the frame 61, the bearing member 63, and the holder 71 are described later in detail.

FIGS. 3 and 4 are cross-sectional views schematically illustrating part of the processing device 4. In FIG. 3, the holder 71 is in the holding state PA1, and the charge roller 15 is separated from the photosensitive drum 13. In FIG. 4, the holder 71 is in the canceled state PA2, and the charge roller 15 is in contact with the photosensitive drum 13. The structures of the frame 61, the bearing member 63, and the holder 71 are described in detail with reference to FIGS. 3 and 4.

As illustrated in FIG. 3, the frame 61 includes a bottom 611, a front side wall 612F, a rear side wall 612R, a front slide wall 613F, and a rear slide wall 613R. The bottom 611 extends in the insertion direction D1. The front side wall 612F is erected at the end of the bottom 611 at the front side F, and the rear side wall 612R is erected at the end of the bottom 611 at the rear side R. The front side wall 612F and the rear side wall 612R are erected so as to be perpendicular to the insertion direction D1. The front slide wall 613F is erected parallel to the insertion direction D1 at the end of the bottom 611 at the front side F. The rear slide wall 613R is erected parallel to the insertion direction D1 at the end of the bottom 611 at the rear side R.

The bearing member 63 includes the front bearing member 63F and the rear bearing member 63R. The front bearing member 63F is slidably supported by the front side wall 612F and the front slide wall 613F of the frame 61 and is movable in a direction close to and away from the photosensitive drum 13. The rear bearing member 63R is slidably supported by the rear side wall 612R and the rear slide wall 613R of the frame 61 and is movable in a direction close to and away from the photosensitive drum 13.

The holder 71 includes an engaging section 72 (a front engaging section 72F and a rear engaging section 72R), an engaged section 73 (a front engaged section 73F and a rear engaged section 73R), an insertion section 75 (a front insertion section 75F and a rear insertion section 75R), and a contact section 77 (a front contact section 77F and a rear contact section 77R).

The front engaging section 72F and the rear engaging section 72R are sections that have a claw-like shape to be engaged with the front engaged section 73F and the rear engaged section 73R, respectively. The front engaging section 72F is provided in the front bearing member 63F so as to be opposed to the front side wall 612F. The rear engaging section 72R is provided in the rear bearing member 63R so as to be opposed to the rear side wall 612R.

The front engaged section 73F and the rear engaged section 73R are sections that are engaged with the front engaging section 72F and the rear engaging section 72R, respectively. The front engaged section 73F and the rear engaged section 73R have a stepped section that may be engaged with the front engaging section 72F and the rear engaging section 72R having a claw-like shape. The front engaged section 73F is provided in the front side wall 612F, and the rear engaged section 73R is provided in the rear side wall 612R. The positions where the front engaged section 73F and the rear engaged section 73R are formed are set such that, when the front engaging section 72F and the rear engaging section 72R are engaged, the charge roller 15 is separated from the photosensitive drum 13.

As illustrated in FIG. 3, when the front engaged section 73F and the rear engaged section 73R are engaged with the front engaging section 72F and the rear engaging section 72R, respectively, the holder 71 is in the holding state PA1 so that the charge roller 15 is separated from the photosensitive drum 13. As illustrated in FIG. 4, when the engagement between the front engaged section 73F and the front engaging section 72F and between the rear engaged section 73R and the rear engaging section 72R is canceled, the holder 71 is in the canceled state PA2 so that the charge roller 15 is in contact with the photosensitive drum 13.

The front insertion section 75F and the rear insertion section 75R are provided in the front side wall 612F and the rear side wall 612R, respectively. The front insertion section 75F and the rear insertion section 75R are provided so as to penetrate in the insertion direction D1. The front engaged section 73F and the rear engaged section 73R are provided at the ends of the front insertion section 75F and the rear insertion section 75R, respectively.

The front contact section 77F and the rear contact section 77R are provided in the front side wall 612F and the rear side wall 612R, respectively. When the holder 71 is in the canceled state PA2, the front contact section 77F and the rear contact section 77R are in contact with the front engaging section 72F and the rear engaging section 72R, respectively. As the front engaging section 72F and the rear engaging section 72R are in contact with the front contact section 77F and the rear contact section 77R, respectively, the positions of the front bearing member 63F and the rear bearing member 63R are set with respect to the frame 61 in a state where the charge roller 15 is in contact with the photosensitive drum 13.

A front canceling member 91F and a rear canceling member 91R are members that shift the holder 71 from the holding state PA1 to the canceled state PA2. According to the present embodiment, the front canceling member 91F and the rear canceling member 91R protrude in the insertion direction D1. The front canceling member 91F and the rear canceling member 91R are provided at the positions so as to be in contact with the front engaging section 72F and the rear engaging section 72R via the front insertion section 75F and the rear insertion section 75R, respectively. According to the present embodiment, the front canceling member 91F is provided in the positioning device 51. The rear canceling member 91R is provided inside the processing-device attachment 20 at the end thereof on the rear side R.

Figure 5:
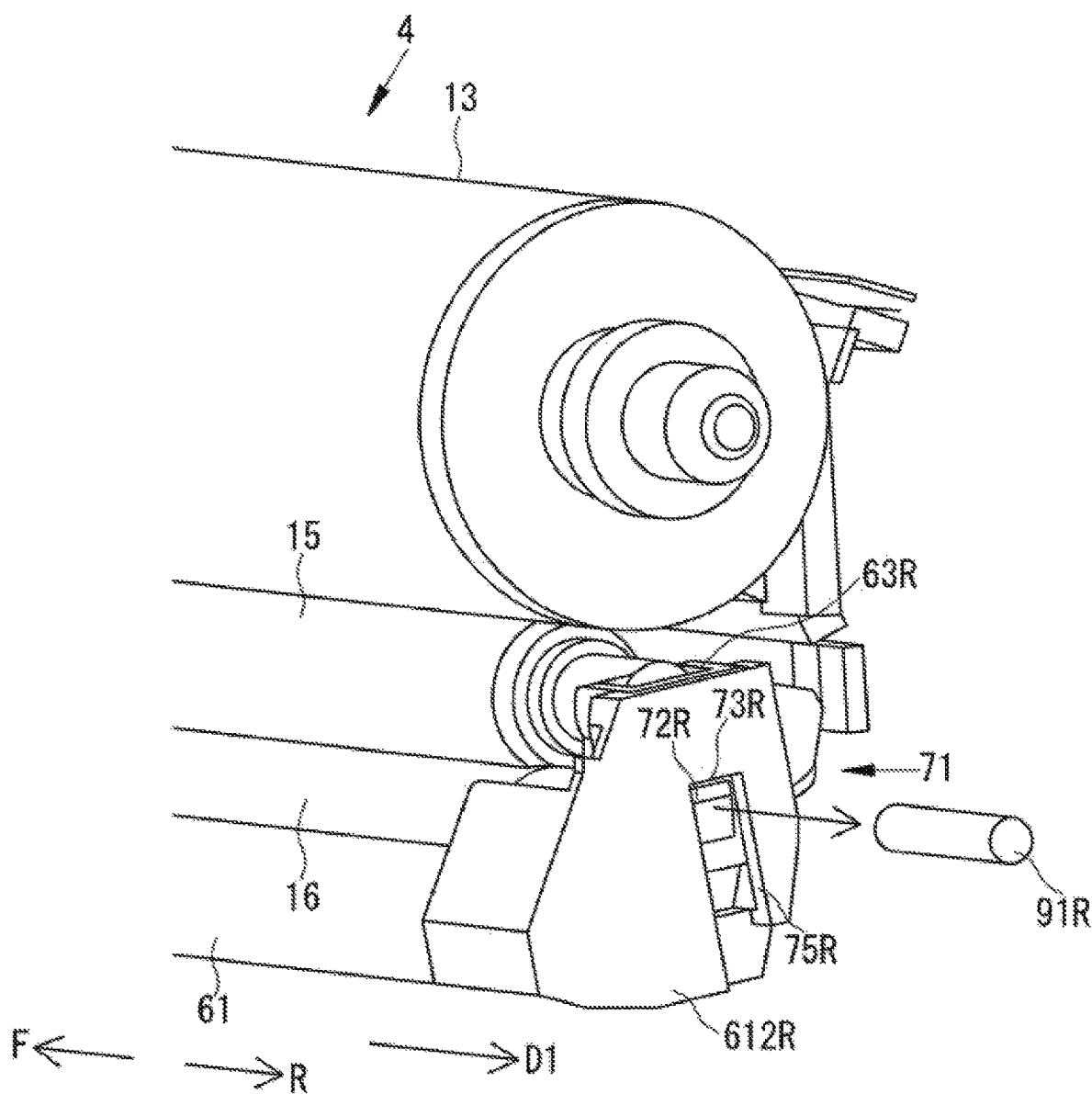
FIG. 5 is a perspective view illustrating an end of the processing device at a rear side.
Figure 6:
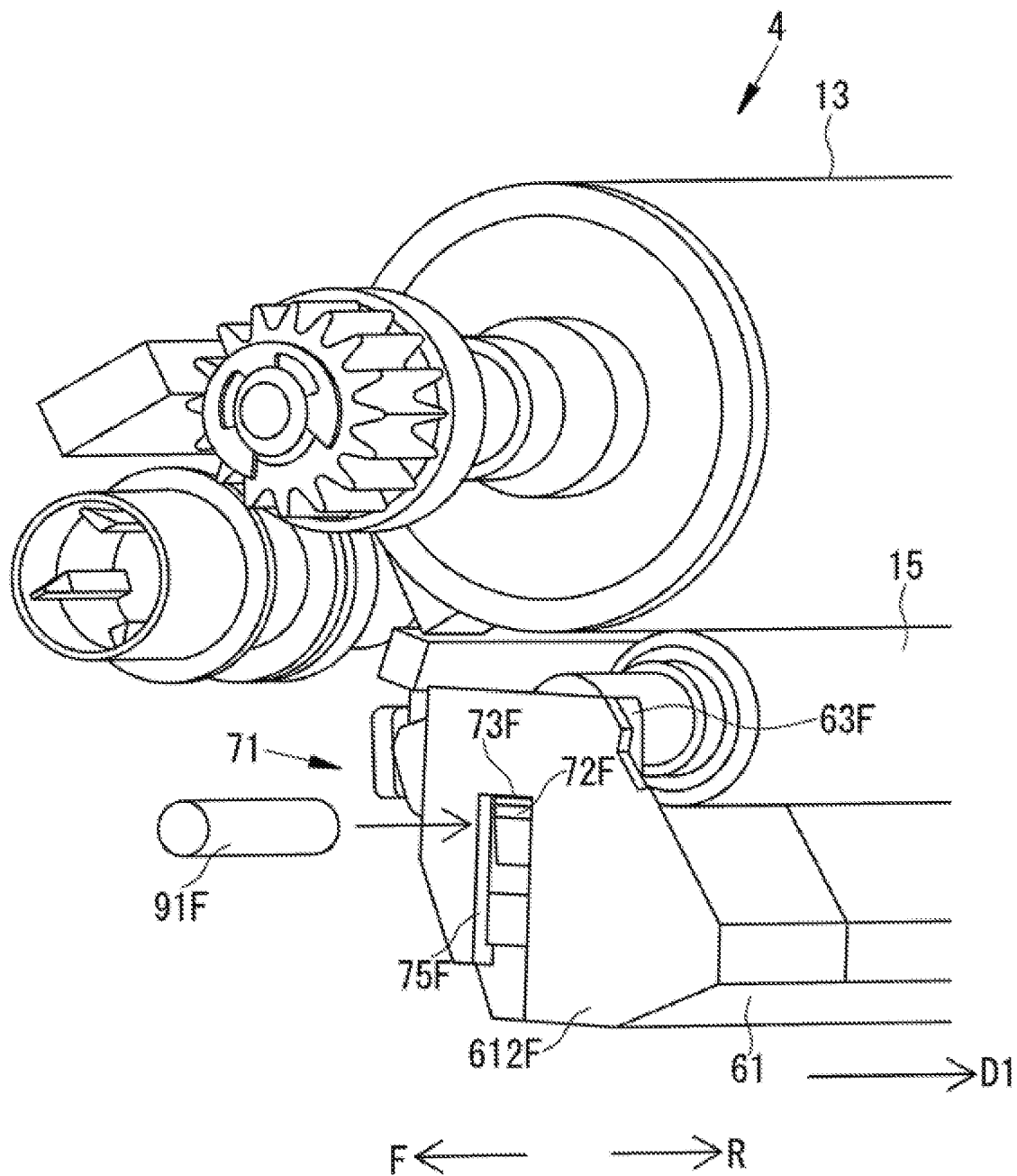
FIG. 6 is a perspective view illustrating an end of the processing device at a front side.

FIG. 5 is a perspective view illustrating the end of the processing device 4 at the rear side R. FIG. 6 is a perspective view illustrating the end of the processing device 4 at the front side F. FIG. 5 illustrates a state where the processing device 4 is inserted into the processing-device attachment 20. FIG. 6 illustrates a state where the positioning device 51 is attached to the processing device 4 at the front side F when the processing device 4 is inserted into the processing-device attachment 20.

As illustrated in FIG. 5, when the processing device 4 is inserted into the processing-device attachment 20 in the insertion direction D1, the rear canceling member 91R provided inside the processing-device attachment 20 is brought into contact with the rear engaging section 72R via the rear insertion section 75R so as to elastically deform the rear engaging section 72R toward the front side F, whereby the engagement between the rear engaging section 72R and the rear engaged section 73R is canceled. In other words, the rear canceling member 91R causes the rear engaging section 72R to move in a direction parallel to the insertion direction D1 so that the rear engaging section 72R shifts from the state of engagement with the rear engaged section 73R to the state of disengagement.

As illustrated in FIG. 6, when the positioning device 51 is attached to the processing device 4 at the front side F in a state where the processing device 4 is inserted into the processing-device attachment 20, the front canceling member 91F provided in the positioning device 51 is brought into contact with the front engaging section 72F via the front insertion section 75F to elastically deform the front engaging section 72F toward the rear side R, whereby the engagement between the front engaging section 72F and the front engaged section 73F is canceled. In other words, the front canceling member 91F causes the front engaging section 72F to move in a direction parallel to the insertion direction D1 so that the front engaging section 72F shifts from the state of engagement with the rear engaged section 73R to the state of disengagement.

As illustrated in FIGS. 5 and 6, when the positioning device 51 is attached to the processing device 4 at the front side F in a state where the processing device 4 is inserted into the processing-device attachment 20, the holder 71 shifts from the holding state PA1 (see FIG. 3) to the canceled state PA2 (see FIG. 4) so that the charge roller 15 shifts from the state of being away from the photosensitive drum 13 to the state of being in contact with the photosensitive drum 13.

Figure 7:
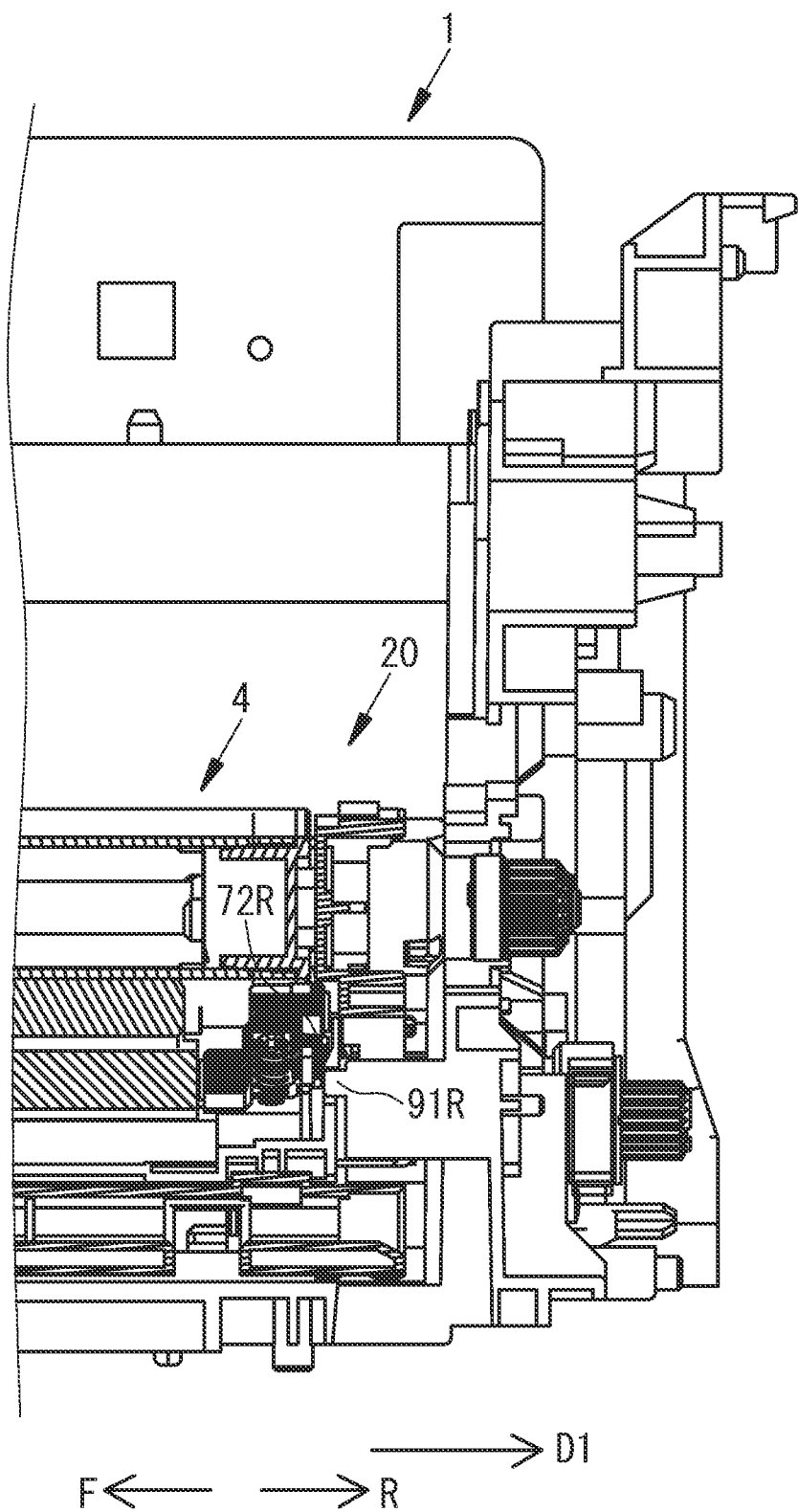
FIG. 7 is a cross-sectional view illustrating a state where the processing device is attached to an image forming apparatus according to the first embodiment of the present invention.
Figure 8:
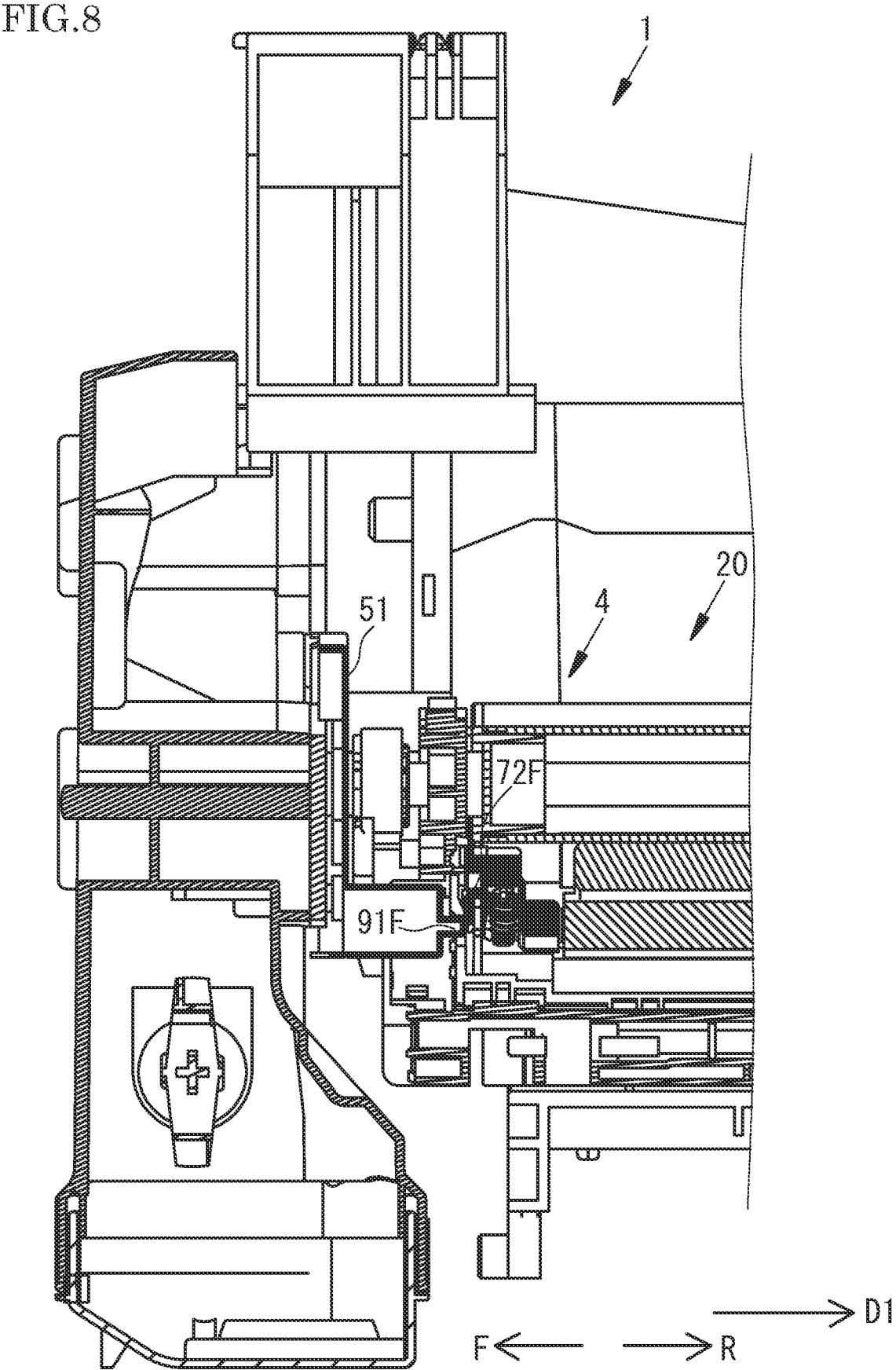
FIG. 8 is a cross-sectional view illustrating a state where the processing device is attached to the image forming apparatus according to the first embodiment of the present invention.

FIGS. 7 and 8 are cross-sectional views illustrating the state where the processing device 4 is attached to the image forming apparatus 1 according to the first embodiment. FIG. 7 illustrates the vicinity of the end of the processing device 4 at the rear side R. As illustrated in FIG. 7, the rear canceling member 91R provided inside the processing-device attachment 20 is brought into contact with the rear engaging section 72R via the rear insertion section 75R so as to elastically deform the rear engaging section 72R so that the engagement between the rear engaging section 72R and the rear engaged section 73R is canceled.

FIG. 8 illustrates the vicinity of the end of the processing device 4 at the front side F. As illustrated in FIG. 8, the front canceling member 91F provided in the positioning device 51 is brought into contact with the front engaging section 72F via the front insertion section 75F so as to elastically deform the front engaging section 72F so that the engagement between the front engaging section 72F and the front engaged section 73F is canceled.

As illustrated in FIGS. 7 and 8, when the positioning device 51 is attached to the processing device 4 at the front side F in a state where the processing device 4 is inserted into the processing-device attachment 20, the holder 71 shifts from the holding state PA1 (see FIG. 3) to the canceled state PA2 (see FIG. 4) so that the charge roller 15 is brought into contact with the photosensitive drum 13 to enable image formation.

Second Embodiment

In the image forming apparatus 1 and the processing device 4 according to the first embodiment, the positioning device 51 includes the front canceling member 91F. In an image forming apparatus 1A and a processing device 4A according to a second embodiment of the present invention, the waste toner box 81 includes a front canceling member 91FA.

Figure 9:
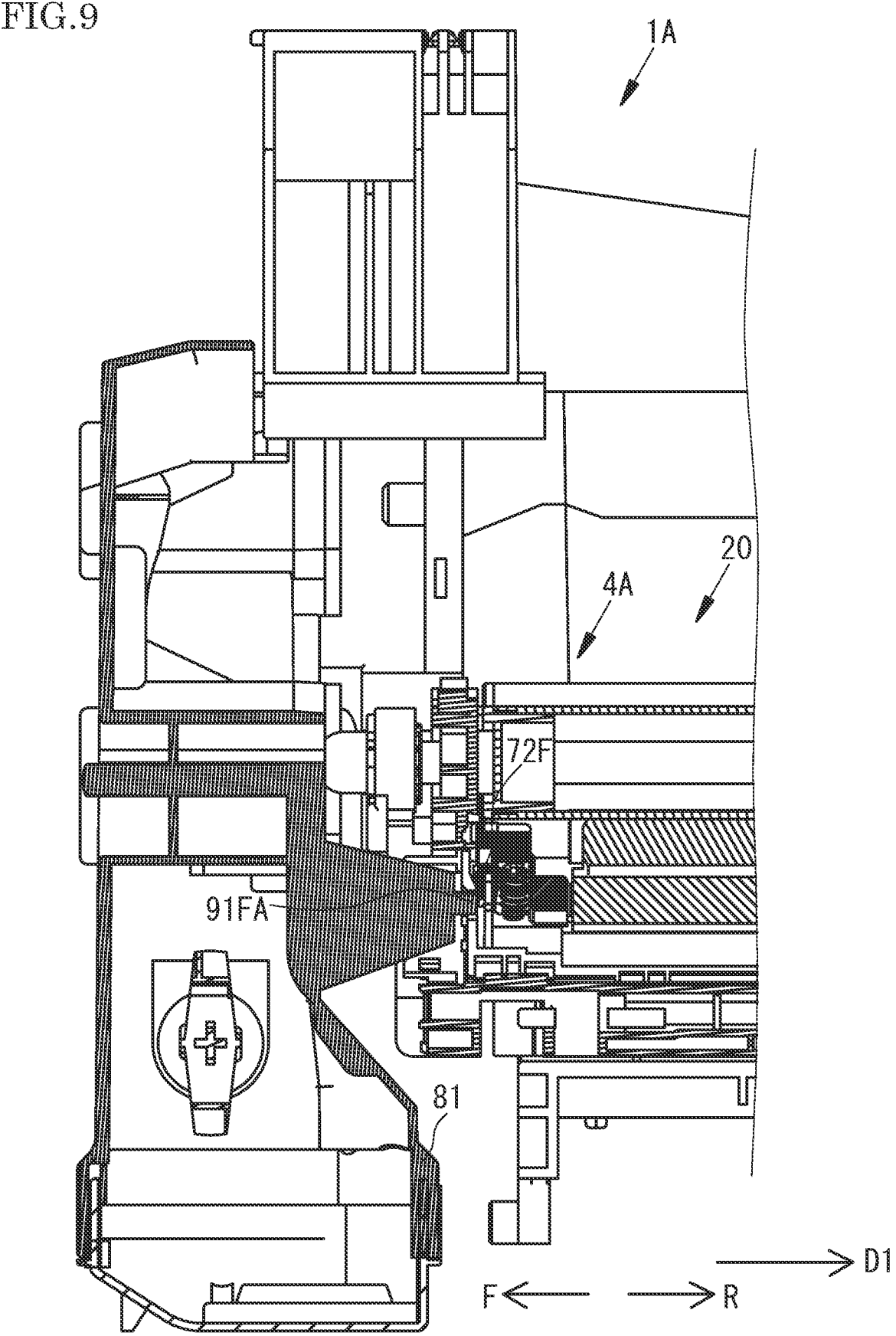
FIG. 9 is a cross-sectional view illustrating a state where a processing device is attached to an image forming apparatus according to a second embodiment of the present invention.

FIG. 9 is a cross-sectional view illustrating a state where the processing device 4A is attached to the image forming apparatus 1A according to the second embodiment. FIG. 9 illustrates the vicinity of the end of the processing device 4A at the front side F. As illustrated in FIG. 9, the front canceling member 91FA provided in the waste toner box 81 is brought into contact with the front engaging section 72F via the front insertion section 75F so as to elastically deform the front engaging section 72F so that the engagement between the front engaging section 72F and the front engaged section 73F is canceled.

Third Embodiment

In an image forming apparatus 1B and a processing device 4B according to a third embodiment of the present invention, the development device 12 includes a front canceling member 91FB.

Figure 10:
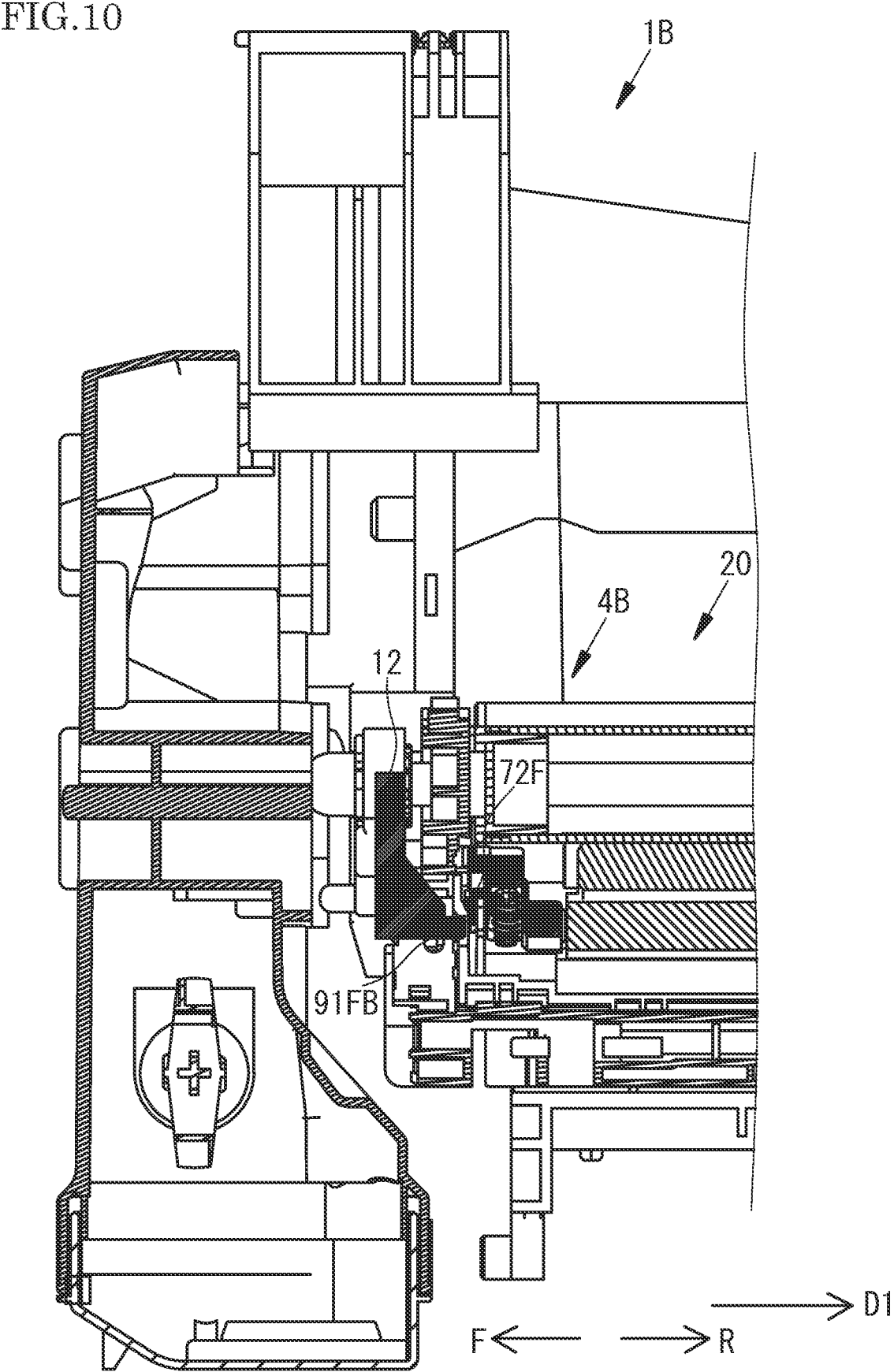
FIG. 10 is a cross-sectional view illustrating a state where a processing device is attached to an image forming apparatus according to a third embodiment of the present invention.

FIG. 10 is a cross-sectional view illustrating a state where the processing device 4B is attached to the image forming apparatus 1B according to the third embodiment. FIG. 10 illustrates the vicinity of the end of the processing device 4B at the front side F. As illustrated in FIG. 10, the front canceling member 91FB provided in the development device 12 is brought into contact with the front engaging section 72F via the front insertion section 75F so as to elastically deform the front engaging section 72F so that the engagement between the front engaging section 72F and the front engaged section 73F is canceled.

Fourth Embodiment

In an image forming apparatus 1C and a processing device 4C according to a fourth embodiment of the present invention, the front cover 9 includes a front canceling member 91FC.

Figure 11:
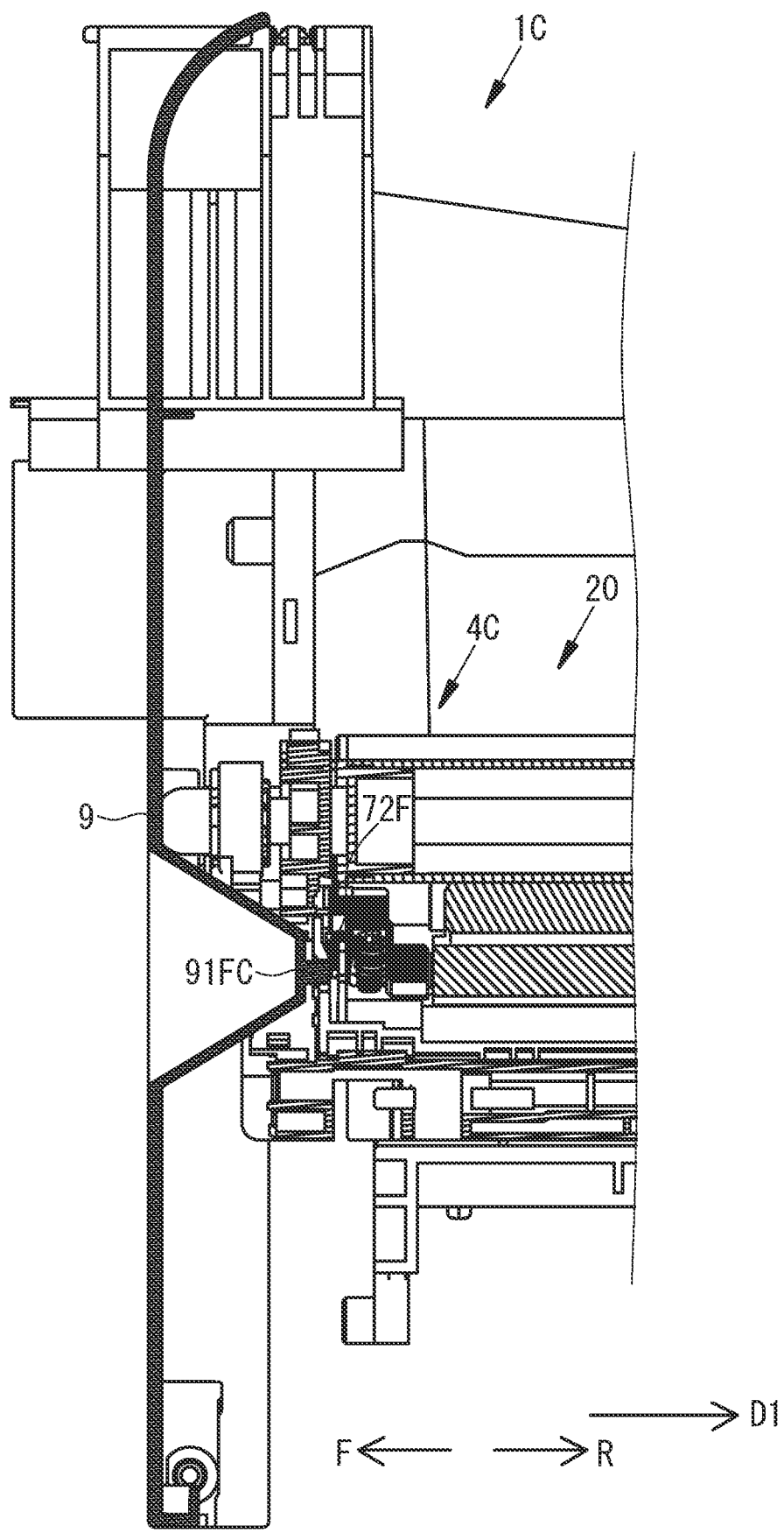
FIG. 11 is a cross-sectional view illustrating a state where a processing device is attached to an image forming apparatus according to a fourth embodiment of the present invention.

FIG. 11 is a cross-sectional view illustrating a state where the processing device 4C is attached to the image forming apparatus 1C according to the fourth embodiment. FIG. 11 illustrates the vicinity of the end of the processing device 4C at the front side F. As illustrated in FIG. 11, the front canceling member 91FC provided in the front cover 9 is brought into contact with the front engaging section 72F via the front insertion section 75F so as to elastically deform the front engaging section 72F so that the engagement between the front engaging section 72F and the front engaged section 73F is canceled.

Fifth Embodiment

Figure 12A:
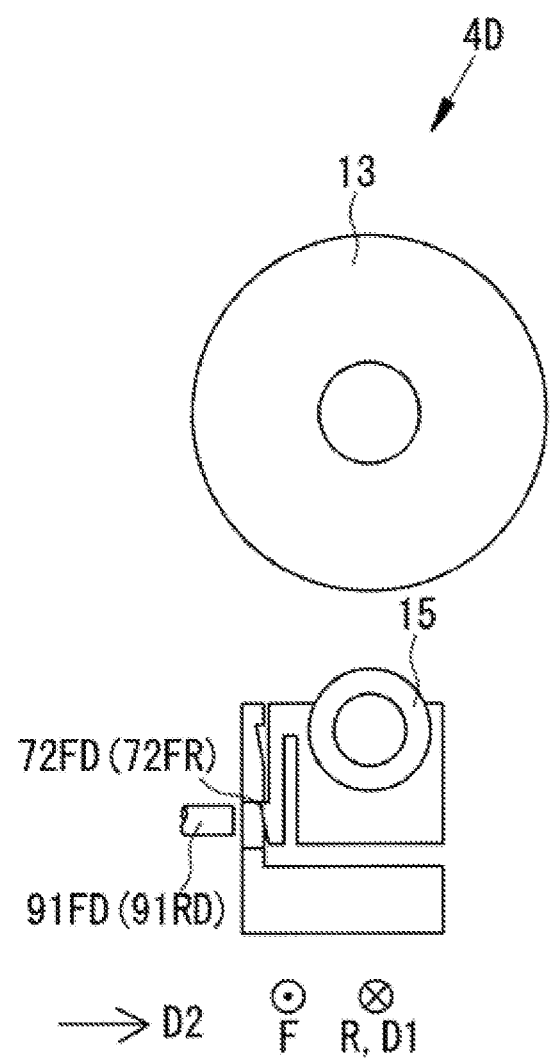

FIGS. 12A and 12B are cross-sectional views schematically illustrating section of a processing device 4D according to a fifth embodiment of the present invention. In the image forming apparatus 1 and the processing device 4 according to the first embodiment, the front engaging section 72F and the rear engaging section 72R are moved in a direction parallel to the insertion direction D1 due to the contact with the front canceling member 91F and the rear canceling member 91R so as to shift from the state of engagement with the front engaged section 73F and the rear engaged section 73R to the state of disengagement. Conversely, in an image forming apparatus 1D and a processing device 4D according to the fifth embodiment of the present invention, as illustrated in FIGS. 12A and 12B, a front engaging section 72FD and a rear engaging section 72RD are moved in a direction D2 perpendicular to the insertion direction D1 due to the contact with a front canceling member 91FD and a rear canceling member 91RD so as to shift from the state of engagement with a front engaged section 73FD and a rear engaged section 73RD to the state of disengagement.

OTHER EMBODIMENTS

The embodiments disclosed herein are illustrative in all respects and do not provide a basis for limited interpretation. Therefore, the technical range of the present invention is not interpreted only by using the above-described embodiments but is defined based on the description in the scope of claims. Furthermore, the technical range of the present invention includes the meanings equivalent to those in the scope of claims and all modifications within the scope.

For example, although the canceling member is provided in any of the development device 12, the positioning device 51, the waste toner box 81, and the front cover 9 according to the present embodiment, the canceling member may be provided in a different device, or the like, attached to the processing device at the front side F.

INDUSTRY AVAILABILITY

The present invention is applicable to an electrophotographic image forming apparatus and a processing device provided therein.

What is claimed is:

1. A processing device inserted into a processing-device attachment provided in an image forming apparatus main body from a front side to a rear side of the image forming apparatus main body, the processing device comprising:
   a photosensitive drum;
   a charge roller;
   a frame that supports the photosensitive drum;
   a bearing member that supports the charge roller and biases the charge roller in a direction to be in contact with the photosensitive drum; and
   a holder that is switchable between a holding state in which the charge roller is held at a state of being separated from the photosensitive drum and a canceled state in which the holding state is canceled so that the charge roller shifts to a state of being in contact with the photosensitive drum,
   wherein a canceling member is provided in at least one of inside the processing-device attachment and an attachment body attached to the image forming apparatus main body at the front side in a state where the processing device is attached to the processing-device attachment so as to cause the holder to shift from the holding state to the canceled state,
   wherein the canceling member causes the holder to shift from the holding state to the canceled state when the attachment body is attached to the image forming apparatus main body at the front side in a state where the processing device is attached to the processing-device attachment,
   wherein the holder includes:
      an engaging section provided in any one of the frame and the bearing member; and
      an engaged section provided in another one of the frame and the bearing member,
   wherein the engaging section is engaged with the engaged section in the holding state, and the engaging section is disengaged from the engaged section in the canceled state, and
   wherein the engaging section is moved in a direction perpendicular to a direction from the front side to the rear side of the image forming apparatus main body in a state where the processing device is attached to the processing-device attachment so as to shift from a state of engagement with the engaged section to a state of disengagement.

2. The processing device according to claim 1, wherein the holder further includes an insertion section through which the canceling member is inserted, and shifts from the holding state to the canceled state when the canceling member is brought into contact with the engaging section through the insertion section.

3. The processing device according to claim 1, wherein the attachment body is any one of a development device, a positioning device, a waste toner box, and a front cover.

4. An image forming apparatus comprising the processing device according to claim 1.

\* \* \* \* \*